United States Patent [19]

Miyamoto et al.

[11] 4,254,614

[45] Mar. 10, 1981

[54] DEVICE FOR SUPPORTING A SPINDLE OF AN OPEN-END SPINNING FRAME

[75] Inventors: Noriaki Miyamoto; Masao Shiraki, both of Kariya; Kinpei Mitsuya, Aichi, all of Japan

[73] Assignee: Kabushiki Kaisha Toyoda Jidoshokki Seisakusho, Aichi, Japan

[21] Appl. No.: 82,721

[22] Filed: Oct. 9, 1979

[30] Foreign Application Priority Data

Oct. 18, 1978 [JP] Japan .......................... 53-143672[U]
Oct. 19, 1978 [JP] Japan .......................... 53-144039[U]

[51] Int. Cl.³ ...................... D01H 1/135; F16C 35/08
[52] U.S. Cl. .................................. 57/58.89; 57/130; 308/149
[58] Field of Search .......................... 57/58.89–58.95, 57/130, 134, 135; 308/26, 149

[56] References Cited

U.S. PATENT DOCUMENTS

| 3,874,751 | 4/1975 | Okubo et al. | 57/58.89 X |
| 3,875,732 | 4/1975 | Ellingham | 57/58.89 |
| 3,911,659 | 10/1975 | Mandl | 57/58.89 |
| 3,958,846 | 5/1976 | Donner | 57/58.89 X |
| 3,972,172 | 8/1976 | Waleckx | 57/58.89 |
| 3,981,132 | 9/1976 | Miyazaki et al. | 57/58.89 |
| 4,116,505 | 9/1978 | Stahlecker | 57/58.89 |

Primary Examiner—Donald Watkins
Attorney, Agent, or Firm—Burgess, Ryan and Wayne

[57] ABSTRACT

A device for preventing a spindle of an open-end spinning frame, which device comprises a rotatable spindle having a rotor attached at one end thereof and a shaft, formed at the other end thereof, to be pressed by a running belt, a bearing casing for rotatably supporting the spindle, a holder for holding the bearing casing via a pair of resiliently yieldable members. At least one of the resiliently yieldable members are detachably mounted on a sleeve detachably secured to the bearing casing. A labyrinth seal is formed between the rotor and the sleeve.

11 Claims, 4 Drawing Figures

DEVICE FOR SUPPORTING A SPINDLE OF AN OPEN-END SPINNING FRAME

TECHNICAL FIELD TO WHICH THE INVENTION RELATES

The present invention relates to a device for supporting a spindle of an openend spinning frame, more especially, the present invention relates to a device which can absorb by means of at least two vibration preventing members the vibration of a spindle caused by the high speed rotation thereof and which can provide various resonant frequencies by replacing or by changing at least one of the vibration preventing members.

BACKGROUND OF THE INVENTION

Known is a device for supporting a rotatable spindle in an open-end spinning frame, which device comprises a spinning rotor, a spindle, one end of which is connected to the rotor and the other end of which has a whorl to be frictionally contacted with a high speed driving belt, a bearing casing for rotatably supporting the spindle, and a holder for holding the bearing casing therein. In the device, the movement generated by the high speed running of the belt is transmitted as a mechanical vibration to the holder via the spindle and the bearing casing, and accordingly, a noise is created.

Known is a device wherein resiliently yieldable members are sandwiched by a bearing casing and a holder so that the vibration is absorbed by the resiliently yieldable members. (See U.S. Pat. No. 3,874,751.) However, in the known device, the resiliently yieldable members are rigidly secured to the bearing casing by means of forced fitting or the like, and accordingly, when operational conditions, such as the rotational speed of the rotor, required changing, it is very troublesome to effect such changes because of the secured position of the resiliently yieldable members. In addition, since the air exhausting effect from the rotor is increased, and thus, the sucking effect generated by the vacuum within the rotor is also increased, as the rotating speed of the rotor increases, the bearing casing is subjected to the vacuum and leakage of the lubricant, such as a lubricating grease, within the bearing casing may be caused.

To obviate the leakage of the lubricant, known is a device wherein a labyrinth seal is formed at a space between the rotor and the bearing casing so that the rotor and the bearing casing are partitioned from each other by the labyrinth seal. However, in the known device, the resiliently yieldable members are formed independently from the labyrinth seal, and therefore, the construction of the spindle supporting device becomes very complicated.

SUMMARY OF THE INVENTION

An object of the present invention is to provide an improved device for supporting a spindle of an openend spinning frame wherein the spring modulus, the number, the size or the securing position of at least one of the resiliently yieldable members can be arbitrarily changed as the operational conditions, such as the rotational speed of the rotor, are changed. According to the present invention, the object is accomplished by a device wherein at least two resiliently yieldable members, spaced apart from each other along the axis of the spindle, are disposed between the bearing casing and the holder and wherein at least one of said resiliently yieldable members are detachably secured to the bearing casing by a screw threadedly securing a sleeve detachably securing the members on the bearing casing so that the axial positional relationship of the members can be changed.

In an embodiment of the present invention, a sleeve, on which at least one of the resiliently yieldable members are detachably mounted, faces the rotor so that a narrow clearance, which serves as a labyrinth seal, is formed therebetween.

BRIEF DESCRIPTION OF THE DRAWINGS

Some embodiments of the present invention will now be explained with reference to the accompanying drawings, wherein.

DETAILED EXPLANATION OF THE INVENTION

Figure 1:
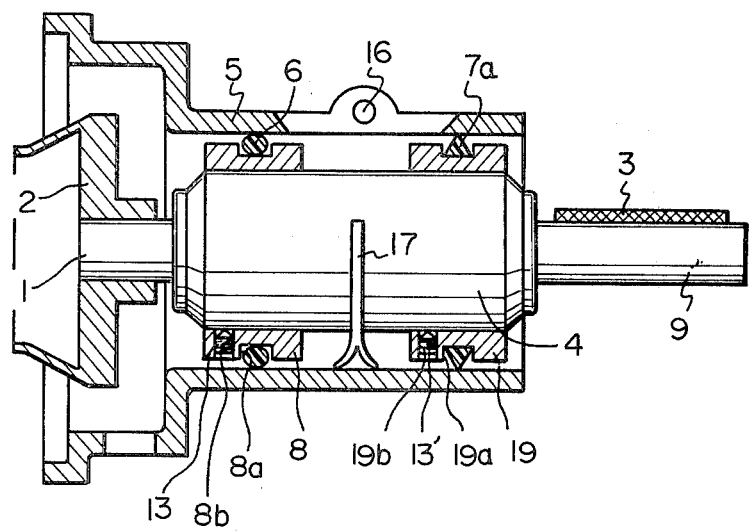
FIG. 1 is a cross sectional elevational view of a first embodiment of the present invention.

Referring to FIG. 1 first, a spindle 1 has at one end thereof a shaft 9 to which a high speed driving belt 3 is forcedly pressed and at the other end thereof a spinning rotor 2, and the spindle 1 is supported at the central portion thereof by a bearing casing 4 which accommodates bearings (not shown). The bearing casing 4 has a pair of sleeves 8 and 19 formed in cylindrical shape. Each sleeve 8 or 19 has a peripheral groove 8a or 19a formed at the peripheral portion thereof. An O-ring 6 having a circular cross section and made of a resiliently yieldable material, such as a natural or synthetic rubber, is engaged within the groove 8a. Similarly, another O-ring 7a having a triangular cross section and made of also a resiliently yieldable material, such as a natural or synthetic rubber, is engaged within the groove 19a. The sleeves 8 and 19 are provided with holes 8b and 19b having threads therein, and accordingly, the sleeves 8 and 19 can be moved along the bearing case 4 and can be arbitrarily secured on the bearing casing 4 by turning screws 13 and 13' engaged with the holes 8b and 19b. The bearing casing 4 is supported by a holder 5 via the sleeves 8 and 19 and the O-rings 6 and 7a which serve as members for preventing the vibration of the spindle of the present invention.

According to this construction, the vibration in the spindle 1 generated by the movement of the running driving belt 3 is absorbed in the vibration preventing members, i.e., the O-rings 6 and 7a, and is not transmitted to the holder 5. The vibration is mainly absorbed in the vibration preventing member located near the driving belt 3, i.e., O-ring 7a; and the vibration preventing member located near the rotor 2, i.e., O-ring 6, prevents the excessive swinging motion of the rotor 2. In this embodiment, the sleeves 8 and 19 can easily be positioned when the device is assembled, and then, they are firmly secured there by screws 13 and 13'.

When the spinning conditions, especially the rotating speed of the rotor 2, are required to be changed, a locking section 16 of the holder 5 is released, and then the bearing casing 4 and other parts connected thereto are as one body withdrawn from the holder 5. To change the spring modulus, size or the position of one or each of the vibration preventing members, i.e., O-rings 6 and 7a, one or both of the vibration preventing members i.e., O-rings 6 and 7a, are released from the sleeves 8 and 19 and new vibration preventing members are inserted. Alternatively, one or both of the sleeves 8 and 19 together with the vibration preventing members i.e., O-rings 6 and 7a, are moved axially or replaced by new ones. In some cases, the sleeves 8 and 9 may forcedly inserted on the bearing casing 4 of adhered thereto.

Figure 2:
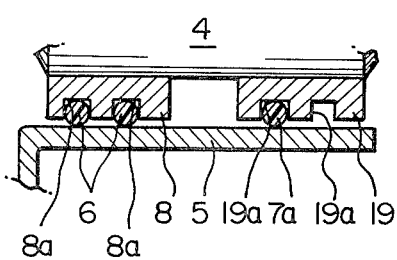
FIG. 2 is a cross sectional partial elevational view of a second embodiment of the present invention.

In the embodiment illustrated in FIG. 2, the sleeves 8 and 19 are forcedly inserted onto the bearing casing 4 and have a plurality of peripheral grooves 8a and 19a. Accordingly, the resiliently yieldable O-rings 6 and 7a engaged within the grooves 8a and 19a are released from the grooves 8a and 19a by means of an appropriate tool, and then they are engaged within other grooves or they are replaced by other vibration preventing members which have a different spring modulus or size from those originally engaged within the grooves.

Referring to FIG. 1 again, reference numeral 17 designates a metallic wire which electrically connects the bearing casing 4 to the holder 5 so that static electricity charged in the spindle 1 and the bearing casing 4 because of the frictional movement between the shaft 9 and the driving belt 3 is released through the metallic wire 17.

Figure 3:
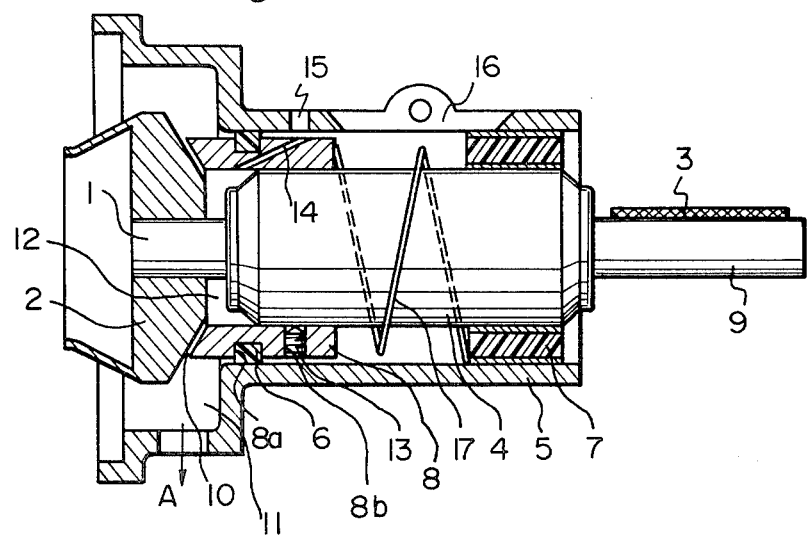
FIG. 3 is a cross sectional elevational view of a third embodiment of the present invention.

In a third embodiment illustrated in FIG. 3, the same parts as those in FIG. 1 are designated by the same reference numerals as those in FIG. 1, and their detailed explanation is omitted here. A vibration preventing member 7 has an annular shape and a rectangular cross section, and it is made of a resiliently yieldable material, such as natural or synthetic rubber. The vibration preventing member 7 is adhered to the bearing casing 4 at a position near the shaft 9. The sleeve 19 illustrated in FIG. 1 is not used in this embodiment. However, the sleeve 8 is used in this embodiment with some modification thereto. The front end of the sleeve 8 is extended forwardly toward the rotor 2 and is formed in a shape corresponding to the outer surface of the rotor 2 so that a narrow clearance 10 is formed therebetween, which clearance 10 serves as a labyrinth seal. The sleeve 8 has a small hole 14 which communicates a space surrounded by the rotor 2, sleeve 8 and the bearing casing 4 with a space formed within the holder 5. The O-ring 6 in this embodiment has a square cross sectional shape; however, it may have a circular or trianglular cross sectional shape as illustrated in FIG. 1. The metallic wire 17 for releasing static elasticity is formed helically and inserted between the bearing casing 4 and the holder 5.

The position of the sleeve 8 is varied along the axial direction of the spindle 1 so that the clearance 10 having an appropriate amount for the labyrinth effect is formed, and then is fixedly secured to the bearing casing 4 by means of the screw 13. If the sleeve 8 is directly in contact with the holder 5, the vibration may be transmitted from the spindle 1 to the holder 5. To reduce the transmission of the vibration to the holder 5, the vibration preventing i.e., the O-ring 6 made of a resiliently yieldable material, is engaged within the groove 8a formed on the sleeve 8 so that it becomes in contact with the holder 5. The number of the vibration preventing members is two in the embodiment illustrated in FIG. 3; however, it may be more than two if at least one of the members is detachably mounted on the bearing casing 4.

Because the device of this embodiment is constructed in the foregoing manner, the vibration generated by the movement of the running driving belt 3 is absorbed in the two vibration preventing members 6 and 7 and is not transmitted to the holder 5. In addition, the aerodynamical influence caused by the air flow A around the rotor 2 is not transmitted into the space 12 located in front of the bearing casing 4 because of the clearance serving as the labyrinth seal 10, and as a result, the leakage of the lubricant from the bearing casing 4 does not occur.

The front vibration preventing member, i.e., the O-ring 6, also partitions the space 11 surrounding the rotor 2 from the outside atmospheric air. More specifically, the front vibration preventing member, i.e., the O-ring 6 partitions the space 11 from the communicating holes 14 and 15 which are intended to supply air so as to decrease the vacuum within the space 12 surrounded by the rotor 2, sleeve 8 and the bearing casing 4. The O-ring also partitions the space 11 from the space wherein the locking section 16 is formed.

Figure 4:
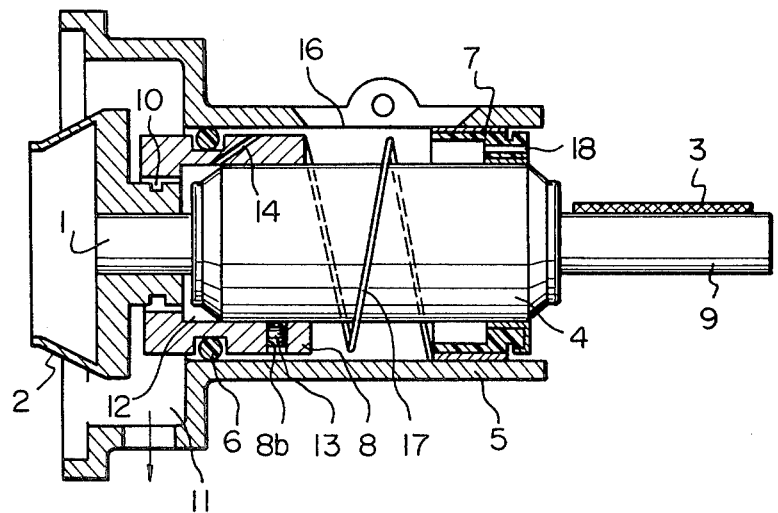
FIG. 4 is a cross sectional elevational view of a fourth embodiment of the present invention.

Since a fourth embodiment illustrated in FIG. 4 has a similar construction to that of the third embodiment, the same parts as those in FIG. 3 are designated by the same reference numerals as those in FIG. 3, and only the different parts will be explained hereinbelow. To increase the effect of the labyrinth seal, the surfaces of the sleeve 8 and the rotor 2, which surfaces face each other to form a clearance 10 therebetween, are different from each other. In addition, the vibration preventing member 7 formed in an annular shape and made of a resiliently yieldable material has a small hole 18 extending in a axial direction so that an air flow passes therethrough for cooling the bearing casing 4.

The present invention has been explained hereinbefore with reference to the illustrated four embodiments; however, various modifications are possible in accordance with the teachings in the present specification and the accompanying drawings within the scope of the present invention defined hereinafter in the claims, for example, the left half of FIG. 3 and the right half of FIG. 4 can be combined together.

According to the present invention, the spring modulus, number, size and position of the vibration preventing members can be varied in accordance with the spinning conditions, such as the rotating speed of the rotor, and accordingly, the resonance of the spinning system, which resonance affects adversely the spinning operation, can be avoided by varying at will the resonant frequency.

the device of the present invention provides an improved device wherein an operation can be carried out easily so that the vibration preventing members can readily be moved or replaced by other ones, which operation has been difficult and troublesome in a conventionally known device wherein a pair of vibration preventing members are used. Accordingly, when the spinning conditions, especially the rotating speed of the rotor, are changed, availability of the spinning frame can be increased because the resonant frequency of the device can readily be adjusted at a desired value.

What we claim is:

1. A device for supporting a spindle in an open-end spinning frame, which device comprises a rotatable spindle, a bearing casing for rotatably supporting said spindle, a holder for holding said bearing casing therein, and at least two annular elastic members, spaced from each other along an axial direction of said spindle and disposed between said bearing casing and said holder, for preventing the vibration of said spindle, wherein at least one of said members is detachably coupled to said bearing casing so as to be readily removable therefrom.

2. A device according to claim 1, which further comprises a sleeve attached onto said bearing casing and having a peripheral groove, and said detachable member is a resiliently yieldable endless ring and is engaged within said groove.

3. A device according to claim 2, wherein said sleeve has a plurality of peripheral grooves.

4. A device according to claim 2, further comprising set screw means for detachably securing said sleeve to said bearing casing.

5. A device for supporting a spindle in an open-end spinning frame, which device comprises:
 a rotatable spindle;
 a bearing casing for rotatably supporting said spindle;
 a holder for holding said bearing casing therein;
 a sleeve attached onto said bearing casing and having a peripheral groove:
 at least two members, spaced from each other along an axial direction of said spindle and disposed between said bearing casing and said holder, for preventing the vibration of said spindle, at least one of said members being detachably mounted on said bearing casing and comprising a resiliently yieldable endless ring engaged within said groove; and
 a rotor fixed to one end of said spindle, said sleeve extending toward said rotor to form a narrow clearance between said rotor and said sleeve, said narrow clearance serving as a labyrinth seal.

6. A device for supporting a spindle in an open-end spinning frame, which device comprises a rotatable spindle, a bearing casing for rotatably supporting said spindle, a holder for holding said bearing casing therein, at least two members, spaced from each other along an axial direction of said spindle and disposed between said bearing casing and said holder, for preventing the vibration of said spindle, wherein at least one of said members is detachably mounted on said bearing casing, and a metallic member for electrically connecting said bearing casing to said holder.

7. A device according to claim 5, wherein said sleeve has a hole formed therein so as to communicate a space surrounding said rotor with the outside of said sleeve, whereby the vacuum with said space is lowered.

8. A device according to claim 5, wherein the surfaces of said sleeve and said rotor, which surfaces face each other to form a clearance therebetween, are different from each other whereby the labyrinth seal effect is increased.

9. A device according to claim 1, wherein another member is made of a resiliently yieldable material of an annular ring shape and is fixedly mounted on said bearing casing.

10. A device according to claim 9, wherein said annular ring shaped member has a hole formed therein for passing therethrough an air flow for cooling said bearing casing.

11. A device according to claim 3, wherein said resiliently yieldable endless ring is selectively engaged with one of said plurality of peripheral grooves of said sleeve.

* * * * *